June 25, 1968

B. GULISTAN 3,389,736

FASTENER RETAINER ARRANGEMENT

Filed May 26, 1966

INVENTOR.
BULENT GULISTAN

BY

ATTORNEYS.

United States Patent Office 3,389,736
Patented June 25, 1968

3,389,736
FASTENER RETAINER ARRANGEMENT
Bulent Gulistan, Malibu, Calif., assignor to Deutsch
Fastener Corp., Los Angeles, Calif., a corporation
Filed May 26, 1966, Ser. No. 553,240
6 Claims. (Cl. 151—69)

ABSTRACT OF THE DISCLOSURE

A fastener device in which a sleeve is received in an opening in a workpiece, the sleeve having an outwardly projecting portion at either end overlapping surfaces of the workpiece to retain the sleeve within the opening. A nut is received in the sleeve, the nut having an outwardly projecting head at one end and a threaded opening extending inwardly in the other. An integral outwardly projecting portion on the shank of the nut beyond the sleeve is dimensioned to interferingly engage with the sleeve, thereby preventing withdrawal of the nut from the sleeve so that it is retained by the sleeve to the workpiece.

---

This invention pertains to an arrangement for holding one part of a fastener assembly to a workpiece when the fastener is separated, and in particular to the retention of a nut to a workpiece.

For many fasteners it is necessary to secure the movable fastener component to the workpiece so that it will be available and in position for reassembly when it is to be connected to the mating part of the fastener. Typically, this will involve panel fasteners, where several fasteners will be utilized in securing a panel or other member to a supporting structure. In such fasteners, the nut is associated with the panel, while the stud which it receives is carried by the adjacent structure. The nut of such a fastener includes a head portion from which a shank projects, with the threaded opening extending inwardly from the end of the shank portion. While the nuts must move axially in engaging the studs to secure the panel, they also must be retained by the panel when the fasteners are loosened.

Customarily, the nuts have been held to the panel by means of a split annular resilient member. This element, when the nut is loosened, is adapted to enter an annular groove at the end of the shank of the nut to abut a radial shoulder that prevents the annular member from sliding off the end of the shank. In this position, the outer periphery of the annular member extends beyond the circumference of the shank and can engage the workpiece to preclude separation of the fastener from the workpiece. When the nut is tightened, the split annular member is forced inwardly along the shank of the nut, being expanded as it is slid across a tapered surface upon leaving the groove.

This type of arrangement has proven very unreliable in its performance and does not assure that the fastener component will be retained by the workpiece. The split annular spring element around the shank of the nut is easily dislodged, which, of course, leaves the nut free to slip out of the hole in the panel. Also, this requires the machining of an annular groove in the nut at the end of the shank where the nut customarily is tapered on its exterior to facilitate engagement with the stud. Cutting a groove at this area weakens the nut. The split annular spring elements are limited in the amount of expansion available without causing them permanent distortion. Sometimes when clamped in their expanded position as the fastener is secured, the split annular members will achieve a permanent set, which prevents proper contraction into the annular groove.

Efforts to improve the reliability of conventional fastener retaining devices have led to complexities in construction including variations in the annular spring design. In some instances, protuberances on the inner walls of the spring extend into axial grooves in the shank of the nut. This is a very expensive procedure because machining the grooves into the wall of the nut is quite costly. Moreover, none of these variations is fully reliable, and the possibility always exists that the annular spring will be dislodged from the nut and allow the nut to separate from the workpiece. Once of the more successful modifications utilizes an annular housing around the split annular spring, but this adds to the size and weight of the retainer construction, as well as to its expense.

The present invention provides a simple, low cost arrangement for retaining a fastener to a workpiece, which is completely reliable and under no circumstances will permit the fastener component to escape. It entirely avoids the use of an annular spring element around the shank of the nut, so that there is no separate resilient element to become dislodged. Under the provisions of the present invention, the nut is received within a short sleeve having an inner wall complementary to the circumferential surface of the shank of the nut, which is free to slide axially relative to the sleeve. After the nut has been extended through the sleeve, an annular bead is provided on the shank of the nut beyond the end of the sleeve. This provides a raised portion that will not allow the nut to move back out of the sleeve, so that the parts are held together, with limited axial movement being permitted for the nut. With the nut and sleeve preassembled in this manner, the sleeve is extended through the opening in the workpiece and attached to it. Consequently, the annular bead and the sleeve assure that the nut is not permitted to escape from the workpiece, while limited axial movement of the nut can take place. Also, the sleeve provides a bearing for the nut so that the hole in the workpiece does not become worn and enlarged as conventionally occurs when the workpiece is of a soft material and the fastener of harder material has been secured and loosened several times.

An object of this invention is to provide an improved reliable arrangement for retaining a fastener component to a workpiece.

Another object of this invention is to provide a fastener retaining arrangement of low cost and simple construction.

A further object of this invention is to provide a fastener retaining arrangement which obviates the need for a separate resilient retaining element around the shank of the fastener.

Yet another object of this invention is to provide a fastener retaining arrangement which is light in weight and easy to install.

An additional object of this invention is to provide an arrangement in which there is a bearing for the movable portion of the fastener to avoid wear of the opening in the workpiece.

These and other objects will be become apparent from the following detailed description taken in connection with the accompanying drawing in which.

Figure 1:
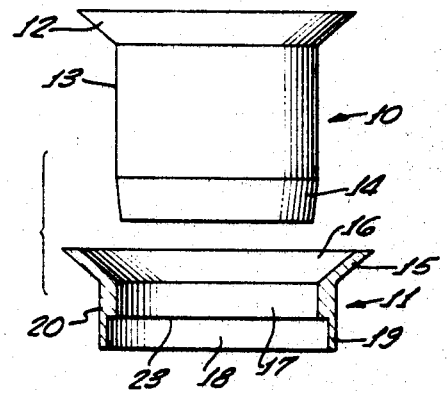
FIGURE 1 is an exploded side elevational view, partially in section of the nut and sleeve prior to their assembly.

The fastener component shown in FIGURE 1, constructed in accordance with this invention, includes a nut 10 and a sleeve 11. The nut 10 is illustrated as having a laterally projecting frustoconical head 12, although other shapes can be used as well, as the form of the head is not critical. A cylindrical shank 13 extends axially beyond the head, terminating in a short frustoconical portion 14 at the end of the shank. This taper at the end of the nut is to facilitate entry of the nut into an opening in a mating part in the event of misalignment at the time the fastener is secured.

The sleeve 11 includes an outwardly extending end flange 15 of frustoconical configuration, having an inner surface 16 complementary to the wall of the head 12 of the nut 10. Beyond the flange 15 is a cylindrical opening 17 that is substantially complementary to the circumference of the shank 13. At the end of the sleeve 11 is an enlarged portion 18 of the opening through the sleeve, leaving a wall section 19 of reduced thickness. The outer circumferential surface 20 of the sleeve is of straight cylindrical form.

Figure 2:
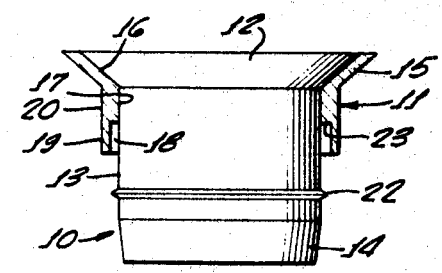
FIGURE 2 is a view similar to FIGURE 1, but with the nut retained in the sleeve.

After being manufactured to the configuration of FIGURE 1, the nut 10 then is introduced into the sleeve 11 as indicated in FIGURE 2. The nut is longer than the sleeve 11 so that a substantial portion of the shank 13 projects past the end of the sleeve. Upon the assembly of the nut and the sleeve, an annular bead 22 is formed on the circumferential surface 13 of the shank of the nut adjacent the frustoconical end portion 14. The bead 22 is integral with the nut and may be formed on the shank by a rolling operation. It will be noted that the bead 22 is larger in diameter than the diameter of the opening 17 through the sleeve 11. This means that the nut is captured in the sleeve and cannot escape from it. Upward movement of the nut 10 relative to the sleeve 11 from the position shown in FIGURE 2 ultimately will cause the bead 22 to interfere with the shoulder 23 between the sections 17 and 18 of the opening through the sleeve, so that the axial travel of the nut is limited. The head 12 engaging the surface 16 of the flange 15 of the sleeve precludes axial movement downwardly from the position of FIGURE 2. Of course, when the head 12 of the nut is in engagement with the surface 16 of the flange 15, as the device is shown in FIGURE 2, the bead 22 is spaced outwardly from the shoulder 23. The abutments formed by the head 12 of the nut and its annular bead 22 are spaced apart a greater distance than the length of the sleeve. Thus, the nut 10 is permitted some degree of axial movement relative to the sleeve, even though it cannot escape from the sleeve.

Figure 3:
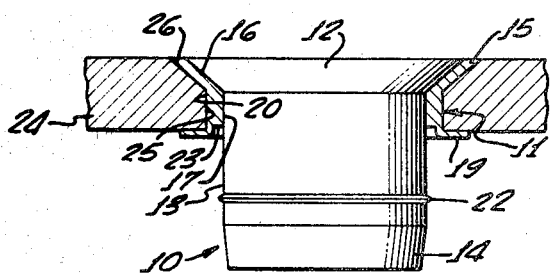
FIGURE 3 is a view similar to FIGURES 1 and 2, but with the sleeve installed and attached in the opening of a workpiece.

After the nut and sleeve are assembled in the manner shown in FIGURE 2, the fastener section may be associated with a workpiece, as shown in FIGURE 3. Here, the workpiece 24 is a panel having an opening 25 substantially complementary to the cylindrical surface 20 of the sleeve 11. There is also a countersunk portion 26 that receives the flange 15 of the sleeve. With the sleeve and nut assembly inserted through the opening 25 in the workpiece 24, the thinner wall portion 19 of the sleeve then is flared outwardly to lock the sleeve to the workpiece 24. The result is a flange on the undersurface of the workpiece that cooperates with the flange 15 at the opposite end of the sleeve to hold the sleeve within the opening 25 in the workpiece 24. Therefore, because the sleeve 11 cannot leave the workpiece 24, the nut 10, likewise, is captured and retained by the workpiece. The nut is permitted its limited axial travel relative to the sleeve and the workpiece, yet the enlarged bead 22 will not allow the nut to escape from the workpiece.

The result is a retaining arrangement for the nut which under no conditions will be nullified, and always will assure that the nut is retained by the workpiece and available to engage the mating portion of the fastener. No resilient parts are needed and there is nothing that could become dislodged to permit the nut to escape. The nut need have no grooves cut in it as in conventional retaining arrangements, so there is no sacrifice in strength as necessarily occurs from the formation of such a groove. It is a simple and economical operation to roll form the annular projection 22 on the periphery of the shank of the nut.

Figure 4:
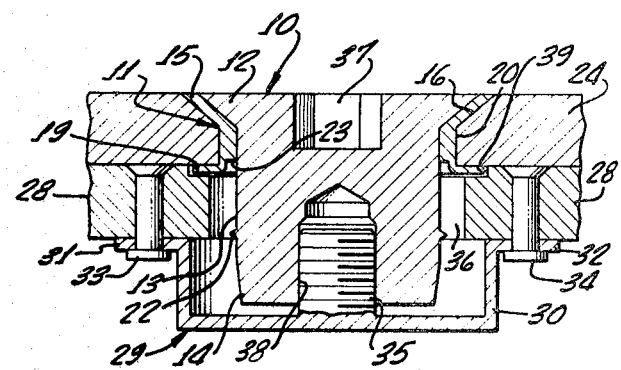
FIGURE 4 is a sectional view of the fastener in its secured position.

In FIGURE 4, the complete fastener is shown in its assembled position, holding together the workpieces 24 and 28. To the latter workpiece is attached a stud assembly 29, which is illustrated as including a housing portion 30 having outwardly projecting flanges 31 and 32 secured by rivets 33 and 34 to the workpiece. A threaded stud 35 extends inwardly from the end wall of the housing 30 toward the opening 36 in the workpiece 28. It should be understood that the stud assembly 29 may be varied somewhat from the construction illustrated. When the fastener is secured, the nut is rotated through the driving recess 37 in the head 12, so that the threaded aperture 38 that extends axially inwardly from the end of the shank portion of the nut is engaged with the threaded stud 35. The bead 22 does not interfere with this movement of the nut as it is of smaller diameter than that of the opening 36 in the workpiece 28.

An annular recess 39 may be formed in the workpiece 28 around the opening 36 to receive the flange defined by the outwardly bent wall section 19 of the sleeve 11. Alternatively, the recess for the flange of the sleeve may be provided in the workpiece 24.

Moreover, while illustrated as an annular bead 22, the interfering portion of the shank of the nut may be defined by raised portions of other shape, which need not extend the full circumference of the nut. In any event, however, the nut will be given an outwardly extending integral portion after it has been assembled with the sleeve, so that the nut will not become separated from the annular member that receives it.

An added advantage of the arrangement of this invention is found in the bearing support that the sleeve 11 provides for the nut 10. In conventional designs the shank of the nut slides along the surface of the opening in the workpiece when the fastener is engaged and disengaged. Frequently, such as for aircraft use, the workpiece constitutes an aluminum panel, while the fastener is stainless steel. The hard surface of the shank of the nut sliding along the edge of the opening of the much softer aluminum panel will wear the workpiece rapidly and in a short time will result in an oversize opening. With the present invention, however, the shank 13 of the nut 10 bears only against the surface 17 of the sleeve 11 and does not engage the workpiece 24. The sleeve 11 may be made of stainless steel or other material to match the hardness of the material of the nut. Therefore, the workpiece is protected from wear, and the sleeve can be constructed of a material such that the opening through it will not show appreciable enlargement after prolonged use.

The foregoing detailed description is to be clearly understood as given by way of illustration and example only, the spirit and scope of this invention being limited solely by the appended claims.

I claim:
1. A fastener comprising
a stud means having an elongated exteriorly threaded member,
    said stud means being adapted for connection to a workpiece,
a nut,
    said nut having a laterally projecting head at one end thereof,
    a shank extending axially from said head, and a threaded opening extending axially into said shank,
        said threaded opening being adapted for engagement with said elongated threaded member of said stud means,
and a sleeve having an opening therethrough receiving said shank such that said nut is rotationally and axially movable relative to said sleeve, said head of said nut being adjacent one end of said sleeve, said sleeve including a laterally outwardly projecting flange at said one end
engageable on one side by a workpiece and on the opposite side by said head for preventing said axial movement of said nut relative to said sleeve in one direction, said shank including an integral laterally outwardly projecting portion beyond the opposite end of said sleeve, said opening through said sleeve having lateral dimensions less than the lateral dimension of said shank at said integral laterally outwardly projecting portion,
whereby said sleeve prevents axial movement of said nut relative to said sleeve in the opposite direction, said head and said integral laterally outwardly projecting portion being spaced apart relative to said sleeve such that said nut is permitted limited axial movement relative to said sleeve, said sleeve at said opposite end thereof including a portion bent outwardly providing a second flange for cooperating with said laterally outwardly projecting flange at said one end of said sleeve for attaching said sleeve to a workpiece,
whereby said nut through said sleeve is attached to said workpiece and permitted limited axial movement relative thereto.

2. A device as recited in claim 1 in which said sleeve at said portion bent outwardly is provided with a reduced wall thickness.

3. In combination with a duality of workpieces each of which has an opening therethrough, a fastener for holding said workpiece together comprising
a stud means,
means attaching said stud means to one of said workpieces,
said stud means including an externally threaded elongated member extending toward said opening in said one workpiece,
a nut,
said nut having a laterally projecting head at one end thereof,
a shank extending axially from said head, and a threaded opening extending axially into said shank,
said threaded opening being adapted to receive said external threaded elongated member,
a sleeve,
said sleeve receiving said shank so that said nut is rotationally and axially movable relative to said sleeve,
said head of said nut being adjacent one end of said sleeve,
said sleeve including a surface engageable by said head for preventing said axial movement of said nut in one direction,
said shank including an integral laterally outwardly projecting portion adjacent the opposite end of said sleeve,
said sleeve including another surface engageable by said integral laterally outwardly projecting portion for preventing said axial movement of said nut in the opposite direction,
said head and said integral laterally outwardly projecting portion being spaced apart a distance relative to the spacing between said surfaces of said sleeve such that said nut is permitted limited axial movement relative to said sleeve while not being permitted to escape from said sleeve,
and a duality of flanges in opposed relationship extending laterally outwardly from opposite end portions of said sleeve and engaging the other of said workpieces for securing said sleeve in said opening in said other workpiece adjacent said externally threaded elongated member for receiving said externally threaded elongated member.

4. A device as recited in claim 3 in which said other workpiece is of a relatively soft material, and said sleeve and said nut are of a relatively harder material, whereby said sleeve protects said other workpiece against wear at said opening in said other workpiece.

5. In combination with a workpiece having an opening therein, a nut device comprising
a sleeve received in said opening,
said sleeve including a first laterally outwardly projecting portion at one end overlapping a surface on one side,
and a second laterally outwardly projecting portion at the other end overlapping a surface of said workpiece on the other side, and
a member including an outwardly projecting head and a shank projecting therefrom,
said shank including a portion with a cylindrical outer surface,
the distal end of said shank having a threaded opening therein,
said shank slidably extending through said sleeve with said head being outwardly of said sleeve at one end at said one side of said workpiece,
said shank including an integral outwardly projecting portion projecting laterally outwardly of said cylindrical surface of said sleeve adjacent said other end thereof and interferingly engageable with said sleeve for preventing withdrawal of said member from said sleeve,
the spacing between said head and said integral outwardly projecting portion being greater than the length of said sleeve whereby said member is movable axially of said sleeve,
said shank having an inwardly tapering portion at said other end thereof beyond said integral outwardly projecting portion.

6. A device as recited in claim 5 in which said sleeve at said second outwardly projecting portion has a wall thickness less than the wall thickness of said sleeve inwardly of said second outwardly projecting portion.

References Cited

UNITED STATES PATENTS

| | | | |
|---|---|---|---|
| 1,251,676 | 1/1918 | McCaffray | 151—69 |
| 2,018,346 | 10/1935 | Busby | 151—69 |
| 3,037,542 | 6/1962 | Boyd | 151—69 |
| 3,289,726 | 12/1966 | Sauter | 151—69 |

FOREIGN PATENTS

| | | |
|---|---|---|
| 720,884 | 12/1954 | Great Britain. |
| 1,027,931 | 4/1966 | Great Britain. |

EDWARD C. ALLEN, *Primary Examiner.*

R. S. BRITTS, *Assistant Examiner.*